United States Patent [19]

Farlow

[11] 3,789,426

[45] Jan. 29, 1974

[54] FACSIMILE DRIVE APPARATUS

[75] Inventor: Jan M. Farlow, Fort Wayne, Ind.

[73] Assignee: Minnesota Mining and Manufacturing Company

[22] Filed: Dec. 29, 1972

[21] Appl. No.: 319,341

[52] U.S. Cl. .......... 346/138
[51] Int. Cl. .......... G01d 15/24
[58] Field of Search..... 346/138, 103, 178/6.6 DD, 178/6.6 R, 13

[56] References Cited

UNITED STATES PATENTS 2,260,862 10/1941 O'Brien et al. .......... 178/6.6 R

*Primary Examiner*—Joseph W. Hartary
*Attorney, Agent, or Firm*—A. W. Molinare et al.

[57] ABSTRACT

The disclosure describes apparatus for reducing jitter in a facsimile system comprising a frame and a rotatable drum having a first end portion, a second end portion and an axis of rotation. A transducer is positioned near the drum in order to produce an image on a document carried by the drum. The first end portion of the drum is rotatably mounted to the frame through a self-aligning bearing. In order to rotate the drum, a DC motor is used to drive a gear reducing unit that is substantially free from backlash. The second end portion of the drum is coupled to the gear reducing unit by a rigid shaft. Resilient members support the shaft with respect to the frame so that any energy due to a component of movement of the shaft in a direction perpendicular to the axis of rotation is absorbed. A spring biases the transducer toward the drum so that the transducer can follow any eccentric movement of the drum due to alignment errors.

8 Claims, 8 Drawing Figures

FACSIMILE DRIVE APPARATUS

BACKGROUND OF THE INVENTION

1. Field of the Invention

This invention relate to drive apparatus for facsimile systems, and more specifically relates to facsimile drive systems in which a document or copy paper and a scanning or printing transducer are moved relative to one another in order to transmit or reproduce facsimile information.

2. Description of the Prior Art

Many facsimile machines comprise a drive unit which moves a document with respect to a printing transducer that creates an image on the document. In one common type of such a machine, the drive unit comprises a rotated element, such as a drum, which holds the document. The drum is rotated past the transducer at a rapid rate by a motor-driven gear reducing unit. The transducer is slowly moved along the length of the drum so that the entire document is scanned.

Experience has shown that such a facsimile machine tends to create an error or distortion in the image generally referred to as "jitter." This term has been defined as a raggedness in the received copy caused by erroneous displacement of recorded spots in the direction of scanning. One form of jitter is illustrated in FIGS. 2A and 2B. FIG. 2A illustrates a straight line recorded as a series of spots without jitter, whereas FIG. 2B shows the same straight line erroneously recorded due to the effects of jitter.

Since many facsimile machines are used to taansmit typewritten or printed letters of the alphabet, jitter can be a serious problem which affects the legibility of the letters. This difficulty is illustrated by FIGS. 3A and 3B. FIG. 3A illustrates the letter *u* accurately recorded as a series of spots, and FIG. 3B illustrates the same letter erroneously recorded as a *v* due to the effects of jitter.

Jitter can be created by inaccuracies in one or more of the rotating components of the facsimile drive unit or the means used to mount the drive unit. These inaccuracies can cause changes in the relative speed of the printing transducer and document which result in erroneous placement of the recorded spots.

Accordingly, it is one object of the present invention to provide an improved facsimile drive unit that eliminates the inaccuracies causing jitter with a minimum of expense and in a way which allows replacement or repair with a minimum amount of adjustment.

The elimination of jitter is especially difficult in a facsimile system employing a pressure-type printing transducer which applies a variable force against the document in order to create an image. Such a pressure transducer applies a variable torque to the drive unit which tends to vary the relative speed of the transducer and document, thereby creating jitter. If the drive unit includes a gear reduction unit, this variable torque tends to momentarily cause the gears to come out of mesh if the reduction unit is not substantially free from backlash. Similar undesired effects occur if the bearings used to mount various components of the drive unit are not accurately aligned, or if the bearings become defective.

In the past, the elimination of jitter required the mounting of drive unit parts on bearings which were carefully aligned in order to avoid any inaccuracies which would apply a variable torque to the drive unit components. This method of eliminating jitter is extremely costly and generally involves the use of highly skilled technicians during the production or repair procedure in order to properly align the bearings. Previous attempts to eliminate the need for precise bearing alignment have taken the form of a flexible shaft coupled between a rotated element and a gear reducing unit of the drive unit. Although such a flexible shaft can absorb some of the undesired forces created by bearing misalignment, the shaft also introduces jitter since it allows relative movement in the direction of scan between the rotated element and the gear reducing unit.

SUMMARY OF THE INVENTION

The applicant has invented a unique form of apparatus which eliminates jitter without the necessity for precise bearing alignment. Contrary to previous systems which require a rotated element of a drive unit to be precisely positioned at both its ends by bearings, the applicant has discovered that jitter can be eliminated by allowing the driven end of the rotated element to "float," wobble or nutate. Contrary to previous facsimile systems, no attempt is made to align the rotated element. By allowing the driven end of the element to nutate, any inaccuracies in the alignment are dissipated in a manner which creates no jitter and, at the same time, eliminates the necessity for precise alignment.

Applicant's invention provides jitter-free performance in a facsimile system comprising a frame and rotatable member having first and second end portions and an axis of rotation for moving a document with respect to a transducer adapted to produce an image on the document. In such a system, the applicant provides a bearing means for rotatably mounting the first end portion of the rotatable member on the frame. Drive means substantially free from backlash is used in order to rotate the rotatable member. The drive means is connected to the second end portion of the rotatable member through a rigid coupling means. This feature keeps the rotatable member moving at a constant velocity even if variable torque is applied to the member by the transducer or by bearing misalignment.

Since the drum is not precisely positioned with respect to the frame or the drive means, misalignment error can cause the second end portion of the member to cyclically move, wobble or nutate. Although the precise motion varies depending on the type and degree of misalignment, the movement generally has a vector component perpendicular to the axis of rotation of the rotatable member. Normally this movement would be expected to result in severe distortion in the image produced on the document or in chatter of the frame. However, applicant has surprisingly discovered that these difficulties can be overcome by supporting the coupling means with respect to the frame so that the energy created by the vector component of movement perpendicular to the axis of rotation is absorbed. One way of absorbing the energy is by mounting the coupling means to the frame through a resilient member. In addition, the transducer and document are biased respectively toward each other so that the transducer follows the movements of the rotatable member and document.

In spite of the fact that the driven end of the rotatable member is allowed to nutate or wobble, applicant has found that his unique techniques enable the facsimile system to eliminate jitter and to produce an accurate image on a document. The advantages of such an invention are readily apparent. By eliminating the need for precise bearing alignment, applicant has created a facsimile system which eliminates jitter in an inexpensive and fool-proof manner.

DESCRIPTION OF THE DRAWINGS

These and other advantages, objects and features of the invention will hereafter appear in connection with the accompanying drawings wherein like numbers refer to like parts throughout and wherein.

DESCRIPTION OF THE PREFERRED EMBODIMENT

Figure 1:
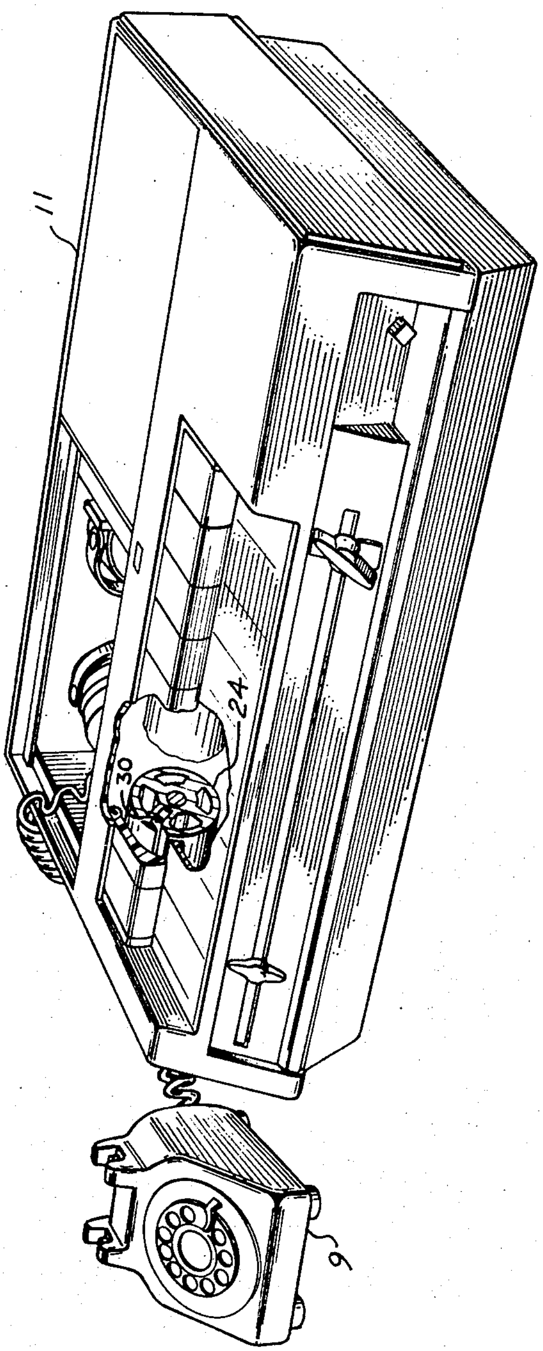
FIG. 1 is an isometric view of a preferred form of a facsimile system made in accordance with the present invention.

Referring to FIGS. 1 and 4–6, a preferred form of facsimile system made in accordance with the present invention and capable of receiving data over a conventional telephone 9 would basically comprise a frame 10, a drum assembly 22, a transducer assembly 34, a drive assembly 50, a coupling assembly 70 and a supporting assembly 76.

More specifically, frame 10 comprises a case 11 which surrounds vertical end plates 12 and 13 that are supported by a bottom plate 14. Plate 13 defines a circular opening 15 through which coupling assembly 70 extends. End plates 12 and 13 support slide rods 16 and 17 on which transducer assembly 34 is moved. A self-aligning bearing 18 is mounted in end plate 12 in order to rotatably mount drum assembly 22.

Figure 6:
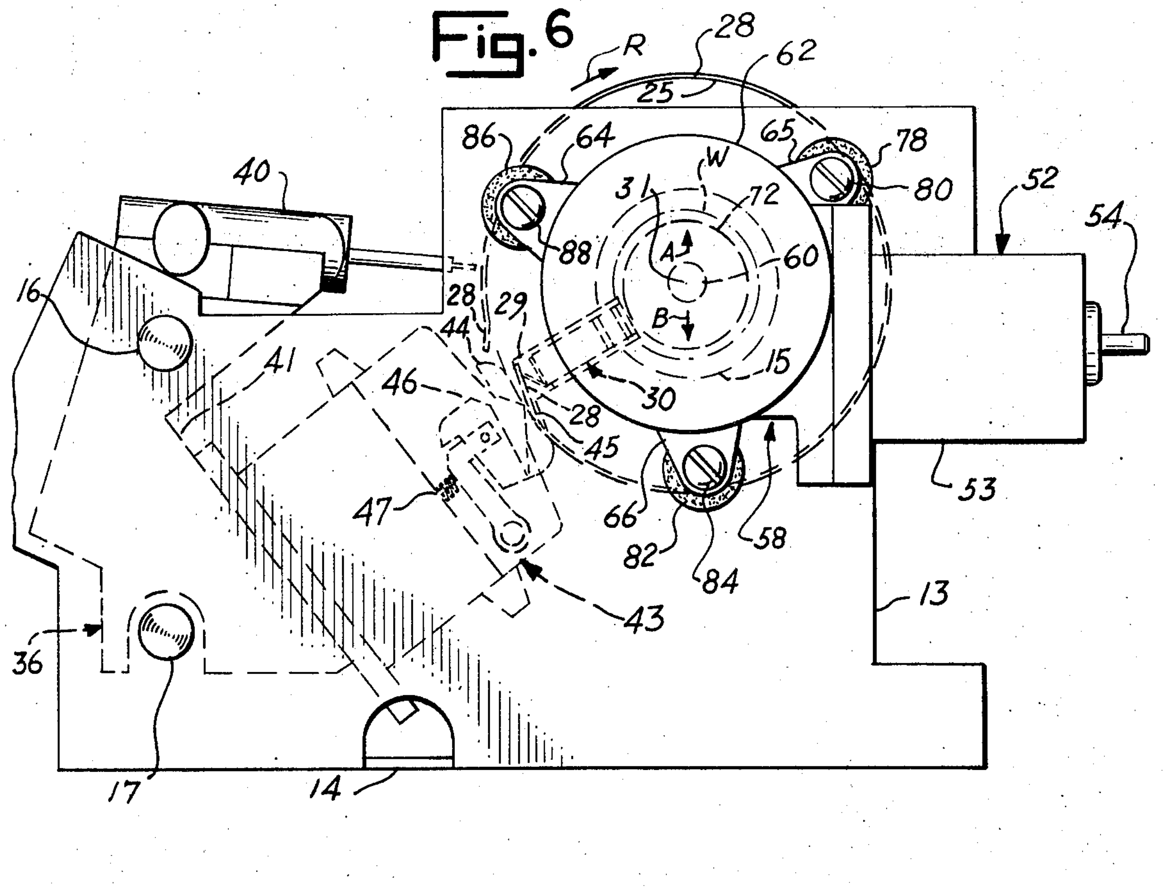
FIG. 6 is an enlarged, fragmentary, end elevational view of the apparatus shown in FIG. 5.

Drum assembly 22 comprises a cylindrical drum 24 having an outer surface 25, a left end portion 26 and a right end portion or driven portion 27. As shown in FIG. 6, the drum defines a slot 29 in which a paper clamp 30 is movably mounted. The paper clamp holds one end of a document 28 so that the document may be wrapped around surface 25 as the drum is rotated around its axis of rotation 31. End portion 26 is rotatably mounted in bearing 18 by means of a collar 32 and a shaft 33 that are rigidly attached to drum 24.

Transducer assembly 34 comprises a carriage 36 that is supported by slide rods 16 and 17 and which is moved along the slide rods by means of an endless belt 37. The belt is rotated by a drive motor and gear arrangement (not shown). The carriage sppports a light source 38 and a light detector 40 that are used for scanning a document wrapped around the drum when the facsimile system is used to transmit data. The carriage defines a lower mounting surface 41 which carries a pressure transducer 43 (FIG. 6). The pressure transducer may be of the type described in U. S. Pat. No. 3,618,124 (Dreisbach — Nov. 2, 1971). However, in place of the roller shown in the patent, the present pressure transducer may utilize a guide shoe 44 having a concave surface 45 with a radius of curvature equal to the radius of curvature of surface 25 of the drum. As a result, surface 45 of guide shoe 44 fits snugly on the surface of the drum. The guide shoe holds a pressure stylus 46 adjacent the drum surface so that the stylus can exert a variable pressure on a document wrapped around the drum in order to create an image on the document. The shoe and stylus are biased toward the drum by a guide spring 47 that enables the stylus to follow the movement of the drum.

Drive assembly 50 comprises a conventional DC motor 52, such as model 375 A141 DC brush-type motor manufactured by the Globe Industries Division of TRW, Inc. The motor comprises a housing 53 and a drive shaft 54 that extends through opposed sides of the housing. The unexposed end of drive shaft 54 extends into a gear box 58 having substantially zero backlash, such as gear box part number 51-9722-01 made by the Spiroid Division of Illinois Tool Works, Chicago, Illinois. A gear box having substantially zero backlash is required so that the gears will not disengage if a variable torque is applied to the drum or if the direction of drum rotation is reversed. 30

Gear box 58 also comprises an output shaft 60 that rotates at a slower speed than shaft 54 of motor 52. Gear box 58 is supported by and contained within a housing 62 that is attached to motor housing 53 and is fitted with flanges 64, 65 and 66.

Coupling assembly 70 comprises a steel collar 72 that is rigidly attached to drum 24 and to output shaft 60. This is an important feature since it prevents the drum from moving relative to output shaft 60. If the drum were allowed to slip relative to the shaft, jitter would normally result, and the image created on a document held on the drum would be distorted.

Supporting assembly 76 comprises solid rubber cylinders 78, 82 and 86 that resiliently support drive assembly 50 and coupling assembly 70 on the frame. Each of the cylinders is threaded at its opposed ends. Cylinders 78 and 86 are connected to end plate 13 by means of screws 79 and 87, respectively, and cylinder 82 is connected to plate 13 by a similar screw not shown. Likewise, cylinders 78, 82 and 86 are held to flanges 65, 66 and 64 by screws 80, 84 and 88, respectively. Each of the screws is threaded directly into its associated rubber cylinder. The screws are sufficiently short so that they do not touch in the middle of the cylinder. As a result, the drive assembly and a coupling assembly are resiliently supported on the frame. The rubber used to fabricate the cylinders is stiff enough to support the weight of the drive assembly, coupling assembly and drum on the frame, but is resilient enough to allow the free movement of these components while the drum is rotated. A preferred cylinder is part no. 88-5650 manufactured by Apex Molded Products Company, Philadelphia, Pennsylvania.

Figures 2A, 2B, 3A, 3B, 4:
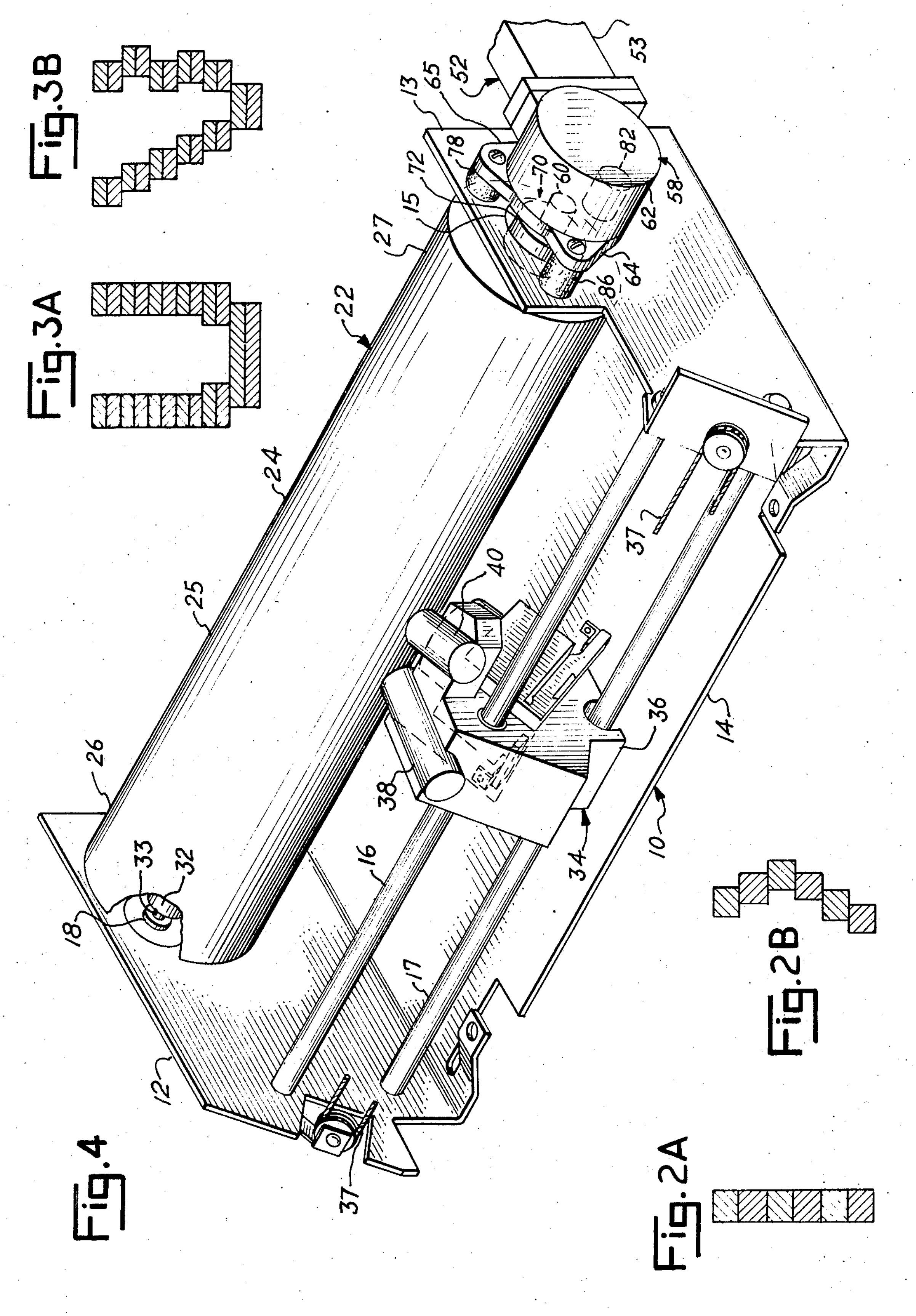
FIGS. 2A, 2B, 3A and 3B illustrate the effects of jitter in a prior art facsimile system.
FIG. 4 is a fragmentary, isometric view of a preferred form of drive unit for use in a facsimile system made in accordance with the present invention.
Figure 5:
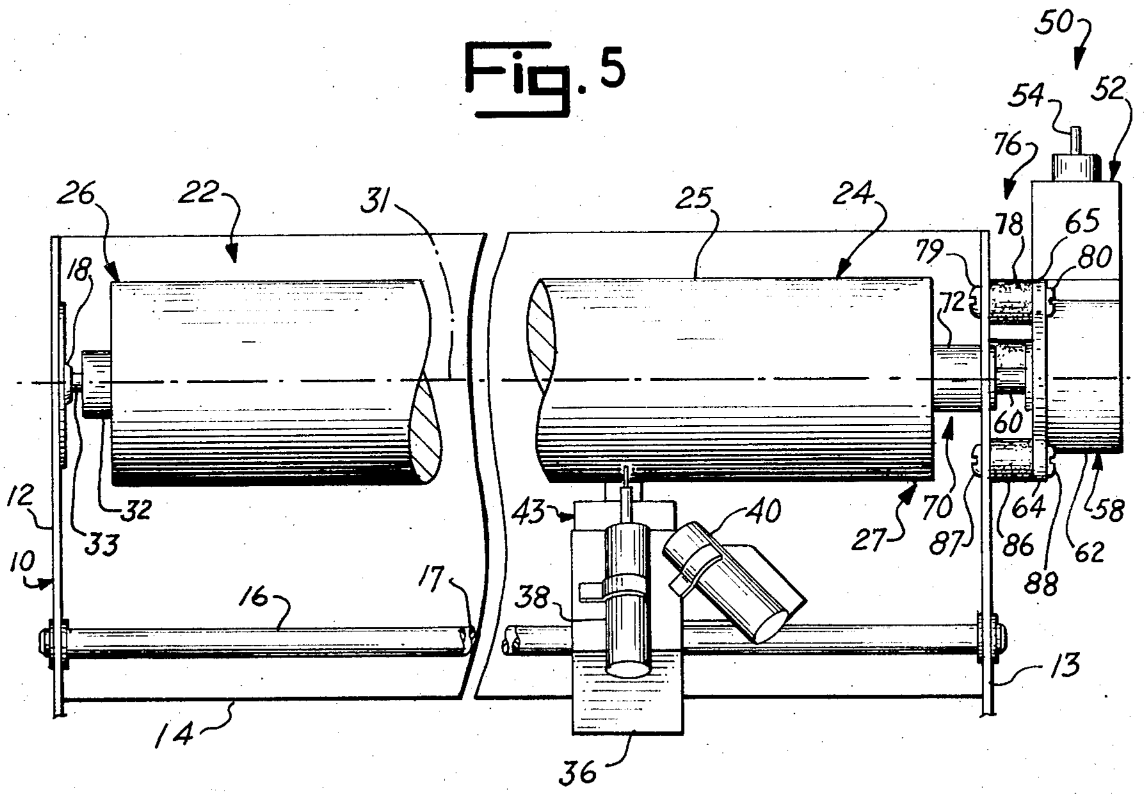
FIG. 5 is a broken, fragmentary, top plan view of the drive unit shown in FIG. 4.

When the facsimile system is used to receive data, one end of document 28 is clamped to the drum by paper clamp 30 and the remainder of the document is wrapped around surface 25 of drum 24. Motor 52 is energized so that the drum is rotated in the direction indicated by arrow R in FIG. 6. Initially, carriage 36 is moved adjacent end plate 13. As information is received, carriage 36 is moved by belt 37 to the left as shown in FIGS. 4 and 5.

Since the drum is not precisely aligned with respect to the frame or drive assembly 50, the right hand end portion 27 generally nutates or wobbles. For example, the drum may nutate or wobble through an arc which defines a locus of points such as circle W (FIG. 6). In other cases, the locus of points may be shaped more like an ellipse. Such operation includes vector components of movement A and B which are perpendicular to axis of rotation 31. The kinetic energy generated by these movements is absorbed by cylinders 78, 82 and 86 so that jitter is eliminated and the frame remains stationary and vibration free. As the drum wobbles, guide spring 47 continually biases shoe 44 against the drum surface so that stylus 46 is able to continuously produce a jitter-free image on the document.

Those skilled in the art will recognize that the embodiment shown herein is merely exemplary of the preferred practice of the invention and may be altered and modified without departing from the true spirit and scope of the invention as defined in the appended claims. For example, supporting assembly 76 could comprise a resilient rubber grommet fitted in the annular space between collar 72 and the perimeter of opening 15. In addition, a rotatable yoke for moving a transducer relative to a fixed document could be used in place of the rotatable drum embodiment described above. Examples of such rotatable yoke arrangements are described in U. S. Pat. No. 3,560,993, issued Feb. 2, 1971, entitled "Writing Stylus For Use In Facsimile Receiver Equipment" and U. S. Pat. No. 3,588,337, issued June 28, 1971, entitled "Mounting Means For Light Source In Facsimile Equipment."

What is claimed is:

1. In a facsimile system comprising a frame and a rotatable member having a first end portion, a second end portion and an axis of rotation for moving a document with respect to a transducer adapted to produce an image on the document, improved apparatus for reducing errors in the image comprising:

bearing means for rotatably mounting the first end portion of the rotatable member on the frame;

drive means for rotating the rotatable member, said drive means being substantially free from backlash;

coupling means for rigidly coupling the second end portion of the rotatable member to the drive means;

support means for supporting the coupling means with respect to the frame and for absorbing energy created by movement of the coupling means in a direction perpendicular to the axis of rotation; and guide means for resiliently urging the transducer and the document toward respective contact with each other, whereby the transducer follows the surface of the document irrespective of eccentric movements of the rotatable member with respect to the frame.

2. Apparatus, as claimed in claim 1, wherein rotatable member comprises a cylindrical drum for holding the document.

3. Apparatus, as claimed in claim 1, wherein the bearing means comprises a self-aligning bearing.

4. Apparatus, as claimed in claim 1, wherein the drive means comprises:

a gear box having an output shaft;

motor means for driving the gear box; and housing means for supporting the gear box and the motor means.

5. Apparatus, as claimed in claim 4, wherein the coupling means comprises a rigid member connected between the rotatable member and the output shaft.

6. Apparatus, as claimed in claim 5, wherein the support means comprises resilient means for mounting the housing means to the frame.

7. Apparatus, as claimed in claim 1, wherein the support means comprises a resilient piece of material.

8. Apparatus, as claimed in claim 1, wherein the rotatable member comprises a cylindrical drum for holding the document; wherein the drive means comprises a gear box having an output shaft, motor means for driving the gear box, and housing means for supporting the gear box and the motor means; wherein the coupling means comprises a rigid member connected betwen the rotatable member and the output shaft; and wherein the support means comprises resilient means for mounting the housing means to the frame.

* * * * *